(12) United States Patent
Moxon

(10) Patent No.: US 10,414,484 B2
(45) Date of Patent: Sep. 17, 2019

(54) AIRCRAFT

(71) Applicant: ROLLS-ROYCE plc, London (GB)

(72) Inventor: Matthew Moxon, Derby (GB)

(73) Assignee: ROLLS-ROYCE plc, London (GB)

(*) Notice: Subject to any disclaimer, the term of this patent is extended or adjusted under 35 U.S.C. 154(b) by 1069 days.

(21) Appl. No.: 14/854,380

(22) Filed: Sep. 15, 2015

(65) Prior Publication Data

US 2016/0083075 A1 Mar. 24, 2016

(30) Foreign Application Priority Data

Sep. 24, 2014 (GB) .................................. 1416842.1

(51) Int. Cl.
| | | |
|---|---|---|
| B64C 11/00 | (2006.01) |
| B64C 3/38 | (2006.01) |
| B64C 3/52 | (2006.01) |
| B64C 29/00 | (2006.01) |
| B64C 11/46 | (2006.01) |
| B64D 45/00 | (2006.01) |

(52) U.S. Cl.
CPC ............ *B64C 11/008* (2013.01); *B64C 3/385* (2013.01); *B64C 3/52* (2013.01); *B64C 11/46* (2013.01); *B64C 29/0033* (2013.01); *B64D 45/00* (2013.01); *B64D 2045/0085* (2013.01); *Y02T 50/14* (2013.01)

(58) Field of Classification Search
CPC ..... B64C 11/008; B64C 11/325; B64C 3/385; B64C 3/52; B64C 29/0033
USPC ......................................................... 244/13
See application file for complete search history.

(56) References Cited

U.S. PATENT DOCUMENTS

| | | | | |
|---|---|---|---|---|
| 2,063,030 A | * | 12/1936 | Crouch ................... | B64C 3/385 244/201 |
| 2,936,967 A | * | 5/1960 | Dancik ................... | B64C 3/385 244/7 C |
| 3,029,043 A | * | 4/1962 | Churchill ............... | B64C 3/385 244/39 |
| 3,053,480 A | * | 9/1962 | Vanderlip ............... | B64C 27/54 244/17.13 |
| 5,096,140 A | * | 3/1992 | Dornier, Jr. ......... | B64C 29/0033 244/12.4 |

(Continued)

FOREIGN PATENT DOCUMENTS

| | | | |
|---|---|---|---|
| GB | 2411969 A | 9/2005 | |
| WO | WO-2011146349 A2 | * 11/2011 | ............. G05D 1/102 |

OTHER PUBLICATIONS

Mar. 19, 2015 Search Report issued in British Patent Application No. 1416842.1.

(Continued)

*Primary Examiner* — Richard R. Green
*Assistant Examiner* — Aaron M Rodziwicz
(74) *Attorney, Agent, or Firm* — Oliff PLC

(57) ABSTRACT

An aircraft (40). The aircraft comprises a plurality of propellers (46) mounted to wings (44). Each propeller comprises at least one blade (72, 74) coupled to a respective propeller cyclic actuator (78) configured to cyclically alter the pitch of the respective blade (72, 74) as the propeller rotates. The aircraft (40) is configured such that provision of cyclic pitch to the propeller (46) twists at least a portion of the wing (44) about a span of the wing (46) relative to the fuselage (42), to thereby adjust the local angle of incidence of the wing (46).

21 Claims, 4 Drawing Sheets

(56) References Cited

U.S. PATENT DOCUMENTS

| | | | |
|---|---|---|---|
| 5,765,783 A | 6/1998 | Albion | |
| 8,702,031 B2 * | 4/2014 | Morris | B64C 39/04 244/12.4 |
| 8,733,690 B2 * | 5/2014 | Bevirt | B64C 29/0033 244/12.4 |
| D743,868 S * | 11/2015 | Cummings | D12/328 |
| 2008/0001028 A1 * | 1/2008 | Kendall | B64C 3/42 244/75.1 |
| 2009/0269200 A1 * | 10/2009 | Karem | B64C 27/37 416/148 |
| 2010/0193644 A1 * | 8/2010 | Karem | B64C 3/10 244/7 R |
| 2011/0315806 A1 * | 12/2011 | Piasecki | G05D 1/102 244/2 |
| 2015/0102156 A1 * | 4/2015 | Devenyi | B64C 39/10 244/13 |
| 2016/0244158 A1 * | 8/2016 | Fredericks | B64C 11/28 |

OTHER PUBLICATIONS

Feb. 1, 2016 Search Report issued in European Patent Application 15185159.

* cited by examiner

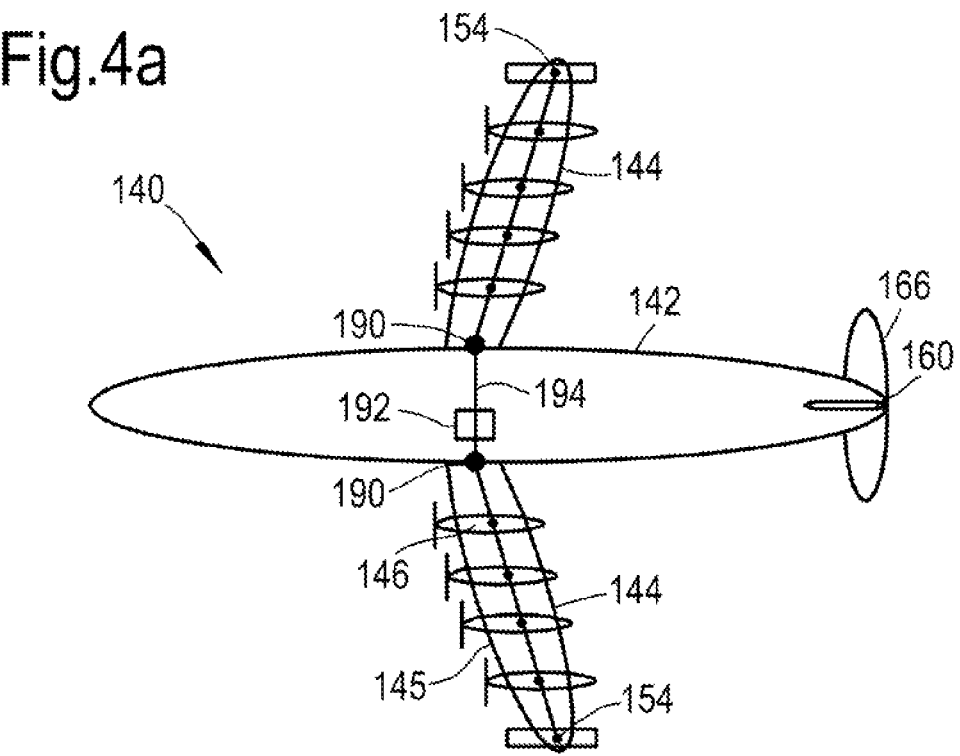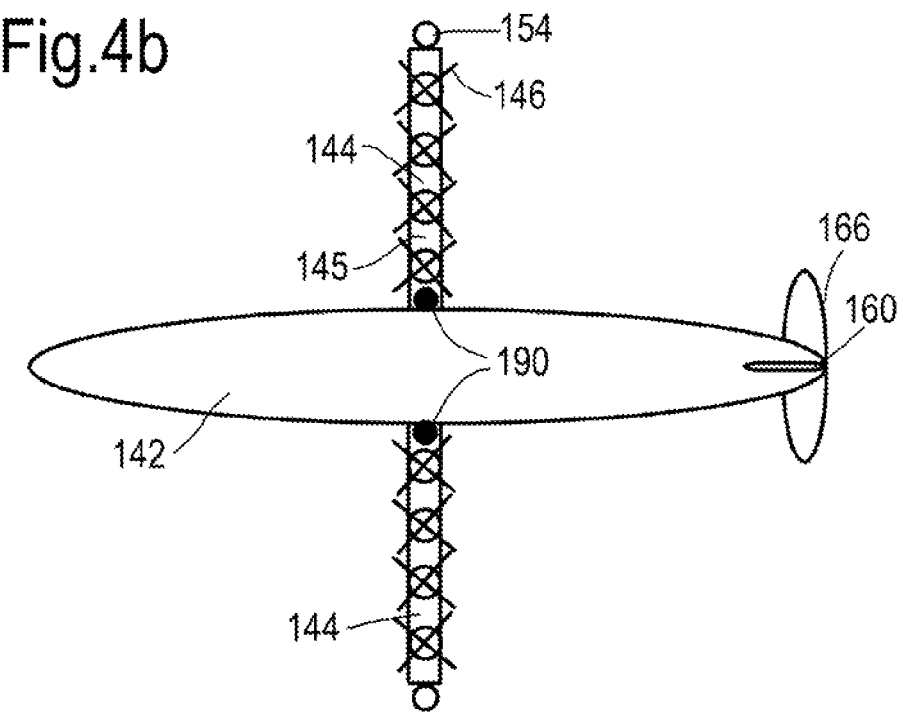

AIRCRAFT

FIELD OF THE INVENTION

The present invention relates to an aircraft, especially but not exclusively, an aircraft having a control arrangement for providing at least one of aircraft roll, pitch and/or yaw control, gust alleviation and vibrational damping.

BACKGROUND TO THE INVENTION

Conventional aircraft are known which comprise a plurality of propellers mounted on wings, which are in turn attached to a fuselage. Control of the aircraft is provided by control surfaces such as ailerons, elevators, and rudders, which can be differentially deflected to effect roll, pitch and yaw respectively, or with a combination of all three. High lift devices such as flaps and slats may also be provided, which can be selectively deployed to increase the lift produced by the wing at the expense of increased drag.

One of the defining features of a wing is the "aspect ratio" which can be defined as the ratio of the square of the span of the wing to its area. In general, a high aspect ratio wing will produce less lift induced drag for a given amount of lift and so, a higher aspect ratio wing will have a greater aerodynamic efficiency compared to a low aspect ratio wing, and so will contribute to a lower fuel burn.

In practice however, very high aspect ratio wings (greater than around 10 to 15) are difficult to achieve in view of structural considerations. As a result of their relatively long length and narrow chord, high aspect ratio wings generally have a lower stiffness (both in terms of torsion about the span of the wing and bending movements along the span of the wing) compared to low aspect ratio wings for given construction methods and materials. Consequently, in order to obtain a high aspect ratio wing, either expensive construction methods and materials must be used, or an increased structural weight must be incurred, thereby reducing the fuel burn benefits of the high aspect ratio wing in view of the greater amount of lift (and therefore drag) that must be produced by the wing to accommodate the increased weight.

High aspect ratio wings also suffer from wind gusts in flight, due to their large increase in lift with increasing angle of attack (α). This may preclude high aspect ratio wings on civil aircraft in view of passenger comfort and/or airframe fatigue considerations, particularly if these aircraft operate at low altitudes for a significant length of time.

In a separate problem, moveable control surfaces such as flaps, ailerons, elevators and rudders are generally aerodynamically inefficient in view of the additional drag created by the control surface when deflected, and add weight to the aircraft. In general, ailerons also affect the lift distribution on the wing, taking the distribution away from the ideal elliptical distribution, and so increasing lift induced drag. Similarly, flaps and slats are relatively aerodynamically inefficient particularly in view of the strong tip vortices shed by such devices, and the effect they have on lift distribution. They are also heavy and complex, particularly in view of the requirement for hydraulic or electric actuators for deploying them.

In a further separate problem, it may be desirable for an aircraft to take off and land in a short distance (i.e. Short Takeoff and Landing, STOVL), or even vertically (i.e. Vertical Take Off and Landing, VTOL). One proposal is to mount the wings to the aircraft on a pivot. When a VTOL takeoff or landing is performed, the wings are pivoted to an upward position, with both the wings and propellers facing upwards. The wings are pivoted to a horizontal position for forward flight. One known example is the GL-10 Greased Lightning, described in "NASA Langley Distributed Propulsion VTOL TiltWing Aircraft Testing, Modeling, Simulation, Control, and Flight Test Development" by Rothhaar et al, published in $14^{th}$ AIAA Aviation Technology, Integration and Operations Conference. However, previous proposed aircraft have included relatively heavy, complex mechanisms for tilting the wing. It is therefore desirable to provide a lightweight, reliable mechanism for converting a tiltwing aircraft between vertical and horizontal flight configurations.

The present invention describes an aircraft control arrangement and a method of controlling an aircraft which seeks to overcome some or all of the above problems.

SUMMARY OF THE INVENTION

According to a first aspect of the present disclosure, there is provided an aircraft comprising:
a propeller mounted to an aerofoil and coupled to a propeller cyclic actuator configured to cyclically alter the pitch of the propeller as the propeller rotates; wherein
the aircraft is configured such that provision of cyclic pitch to the propeller pivots the aerofoil about a span of the aerofoil relative to the remainder of the aircraft and an aircraft flight path vector, to thereby adjust the angle of incidence of at least part of the aerofoil.

Accordingly, cyclic pitch control can be used to adjust the angle of incidence of an aerofoil by pivoting the aerofoil relative to the aircraft flight vector, i.e. altering the angle of incidence of at least a portion of one of the aircraft aerofoils. Consequently, the propeller cyclic pitch actuator can be used to replace or augment one or more of the high lift devices or the ailerons, rudder or elevators, or to provide gust or flutter alleviation.

The aerofoil may be mounted to the aircraft by a bearing arrangement, and the aircraft may be configured such that provision of cyclic pitch pivots the aerofoil about the bearing. The aerofoil may be pivotable between a first position in which a leading edge of the aerofoil faces generally forwardly, and a second position in which the leading edge of the aerofoil faces generally upwardly. The bearing arrangement may comprise a braking mechanism for locking the aerofoil is a position.

Advantageously, the aircraft can provide for conversion between VTOL and forward flight modes in a tiltwing aircraft.

The aerofoil may be rigidly mounted to the aircraft, and the aircraft may be configured such that provision of cyclic pitch twists the aerofoil about the span of the aerofoil.

The aerofoil may comprise one or more of a wing, a yaw control surface and a pitch control surface. Advantageously, propeller cyclic control can be used to effect aircraft control in any of roll, yaw and pitch. The aircraft may comprise a conventional configuration having separate wings and a fuselage, or may comprise blended wing body or flying wing configuration, in which there is no clear dividing line between the wing and fuselage.

The aircraft may comprise a propeller mounted to a port wing, and a further propeller mounted to a starboard wing.

The aircraft may comprise a plurality of propellers mounted to each wing.

Each propeller may comprise one or more propeller blades. The respective propeller cyclic actuator may comprise a motor configured to pivot the respective propeller blade about a longitudinal axis of the respective blade.

Alternatively, each propeller cyclic actuator may comprise a swashplate arrangement.

The wing may comprise a high aspect ratio. The aspect ratio may be greater than 10, may be greater than 15, may be less than 30, and in one embodiment may be approximately 25. Advantageously, by providing a high aspect ratio wing, the torsional rigidity of the wing is reduced, thereby reducing the force needed to twist the wing to adjust the angle of attack of the wing. Simultaneously, the propeller cyclic pitch arrangement can be used to reduce vibrational movement such as flutter, thereby reducing the fatigue that would otherwise be present in such a high aspect ratio wing. Consequently, the aircraft has a high aerodynamic efficiency in view of the high aspect ratio wing, without the high structural weight normally associated with high aspect ratio wings, due to the action of the propeller cyclic pitch arrangement.

The propellers may be electrically driven, and may be located upstream of the respective wing leading edge. The propellers may be arranged such that their axis of rotation intersects a spanwise twisting axis of the aerofoil to which they are mounted. The aircraft may comprise one or more generator arrangements configured to provide electrical power to one or more propeller motors. The generator arrangement may comprise one or more internal combustion engine located outboard of the centre of thrust of the propellers on the respective wing.

The aircraft may comprise one or more high lift devices such as flaps or slats.

The aircraft may comprise a health monitoring system to determine whether one or more cyclic actuators are operable. The aircraft may comprise an aircraft control system configured to decelerate the aircraft to a speed below a critical flutter speed where one or more cyclic actuators are to be inoperable.

According to a second aspect of the present disclosure there is provided a method of controlling an aircraft in accordance with the first aspect of the invention, the method comprising:

providing propeller cyclic pitch to pivot at least part of the aerofoil about a span of the aerofoil, to thereby pivot the aerofoil relative to the remainder of the aircraft and adjust the angle of incidence of at least part of the aerofoil.

The aircraft may comprise at least one propeller mounted to a port wing and at least one propeller mounted to a starboard wing, and the method may comprise altering the propeller cyclic pitch on the at least propeller mounted to one of the port and starboard wing to a different extent to that of the at least one propeller of the other of the port and starboard wing to thereby effect a differential twisting of the wing to effect a roll moment to the aircraft. Advantageously, the method can be used to provide roll to the aircraft to control the aircraft, thereby reducing use of the ailerons and so reducing aerodynamic drag during roll manoeuvres, or permitting deletion or reduction in size of the ailerons and so reducing weight and complexity of the aircraft.

The aircraft may comprise at least one propeller mounted to a yaw control surface, and the method may comprise altering the propeller cyclic pitch to effect a yawing moment to the aircraft. The aircraft may comprise at least one propeller mounted to a pitch control surface, and the method may comprise altering the propeller cyclic pitch to effect a pitching moment to the aircraft.

Each wing may comprise a plurality of propellers, and the method may comprise providing propeller cyclic pitch on at least one of the propellers mounted to the wing to a different extent to that of one of the other propellers mounted to that wing to thereby effect a local twisting of a portion of the wing to effect a local reduction or increase of angle of incidence of that wing.

Alternatively or in addition, the aircraft may comprise at least one propeller on each wing, and the method may comprise providing cyclic pitch of all of the propellers in unison to twist the port and starboard wings relative to the aircraft flight vector to effect an increase in angle of incidence of both wings. Advantageously, the cyclic pitch can be used to increase the lift of the wings without increasing the pitch of the aircraft as a whole, thereby reducing the use of high lift devices such as flaps or slats, or permitting deletion or reduction in size of the high lift devices, thereby reducing weight and complexity of the aircraft.

The method may comprise detecting or predicting a vibration of the wing, and using cyclic propeller pitch to effect local twisting of a portion of the wing to dampen the detected vibration. Advantageously, the method can be used to reduce wing vibration such as flutter. Consequently, the wing can be made less torsionally rigid without encountering excessive flutter, thereby enabling a larger aspect ratio and/or lower structural mass. Advantageously, the consequent reduced torsional rigidity reduces the forces required to twist the wing, thereby enabling larger wing twisting movements for a given propeller arrangement, thereby improving the authority of propeller cyclic actuated differential (i.e. roll) or collective (i.e. increased lift) movements.

The method may comprise detecting or predicting a gust, and using cyclic propeller pitch to effect twisting of at least a portion of the wing to reduce or increase or reduce the angle of incidence of the respective portion of the wing to accommodate the change in lift produced by the gust.

BRIEF DESCRIPTION OF THE DRAWINGS

FIGS. 4a and 4b are plan views of a second aircraft in accordance with the present disclosure in first and second configurations respectively.

DETAILED DESCRIPTION

Figure 1:
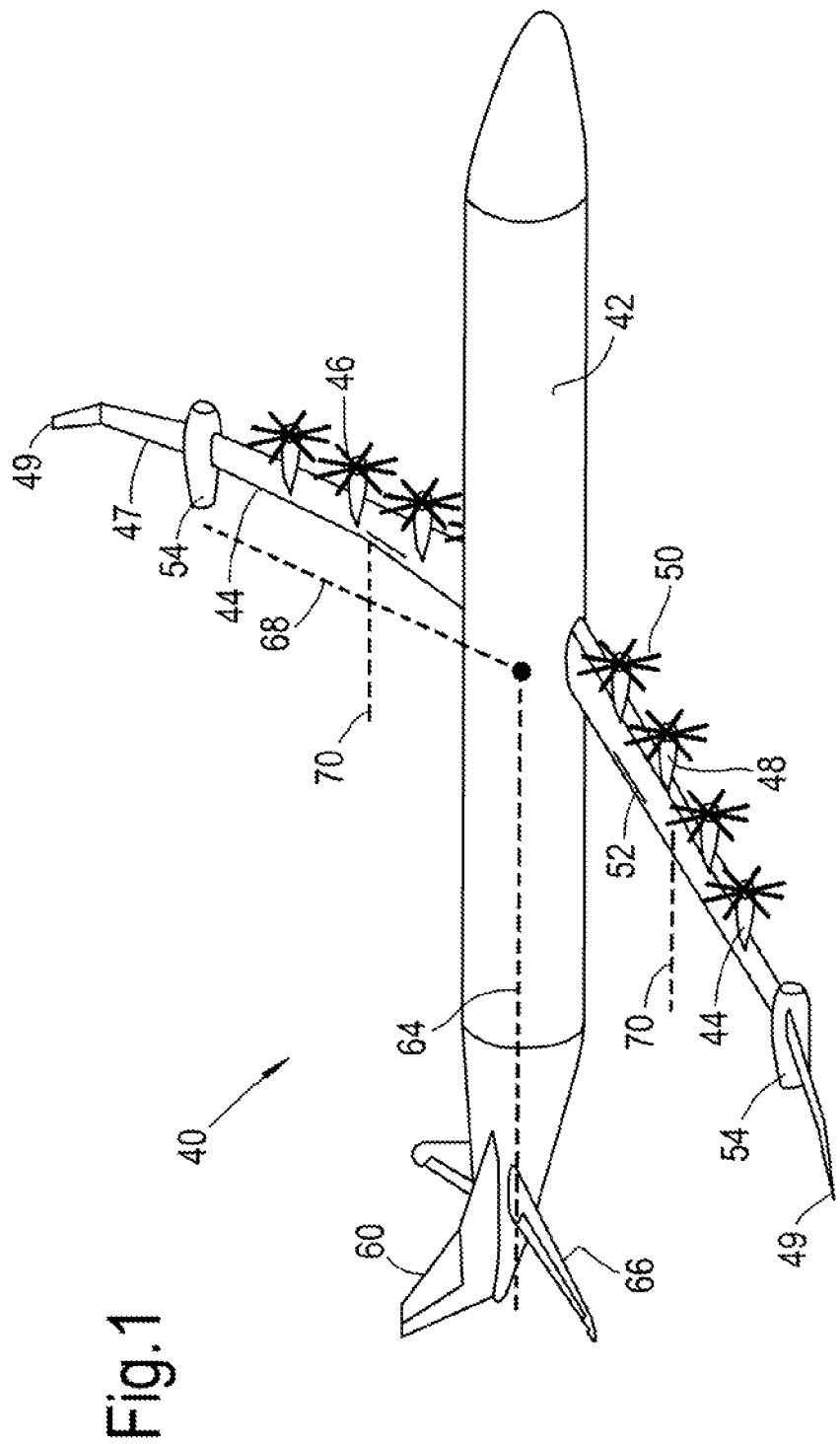
FIG. 1 shows a perspective view of a first aircraft in accordance with the present disclosure.

FIGS. 1 to 4 show an aircraft 40. The aircraft 40 comprises a fuselage 42, a pair of wings 44 extending therefrom generally normal to the fuselage 42, and an empennage located at an aft end of the fuselage 42. The empennage comprises yaw and pitch control surfaces in the form of vertical and horizontal tailplanes 60, 66 respectively. An aircraft flight vector 64 (i.e. a direction in which the aircraft moves through the air) is defined, which in level flight approximately corresponds to a fuselage longitudinal axis.

A wingspan is defined by the distance between wing tips 49. Each wing 44 comprises a leading edge 45 and a trailing edge 47, which together define a chord extending therebetween. The ratio between the wingspan and chord length defines an aspect ratio. As can be seen from FIG. 2, the chord length varies along the wing span, from a relatively large chord at the wing root adjacent the fuselage 42, to a relatively small length at the wing tips 49. In cases such as this where the chord varies along the span, the aspect ratio AR can be defined as the square of the wingspan b divided by the area S of the wing planform:

$$AR = \frac{b^2}{S}$$

Figure 2:
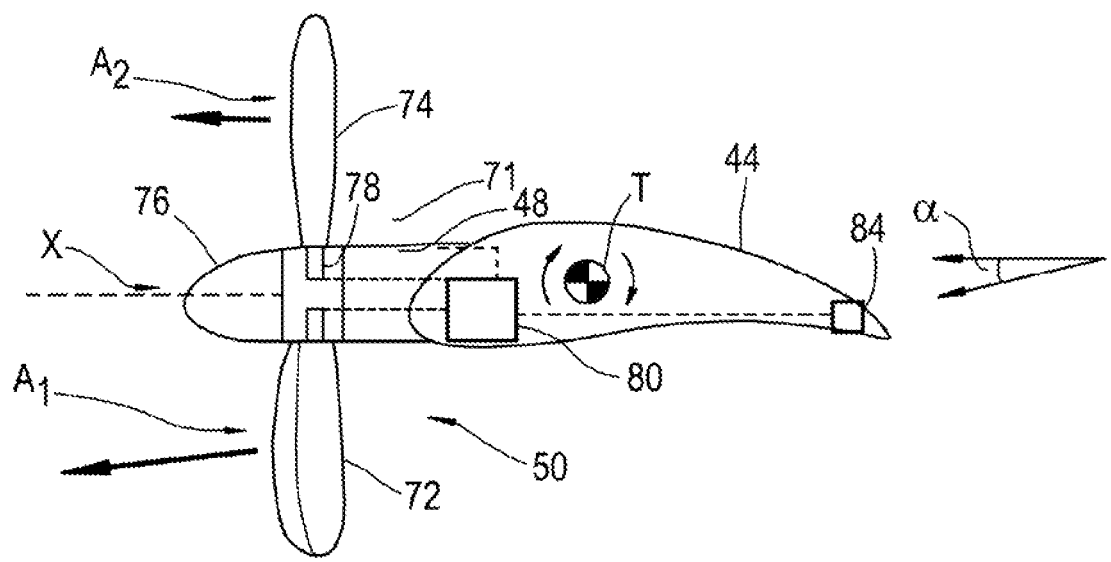
FIG. 2 shows a cross sectional side view a first cyclic pitch change arrangement in accordance with the present disclosure.

In the example shown in FIG. 1, the aspect ratio is approximately 25, though higher aspect ratios such as aspect ratios up to 30 or more may be achieved using the disclosed arrangement. In other cases, lower aspect ratios may be desirable, such as where the aircraft comprises a short takeoff and landing aircraft (STOL). Each wing 44 preferably further comprises a deployable high lift device in the form of flaps 52 located at the trailing edge 47 of each wing 44. Optionally, the deployable high lift device may include one or more slats (not shown) located at the leading edge 45 of the wing. The flaps 52 are selectable between a stowed position (as shown in FIG. 2) and a deployed position, in which the flaps 52 increase the lift coefficient of the wing 44 compared to when the flaps 52 are in the stowed position. The deployable high lift devices may be deployable to intermediate positions between the deployed and stowed positions.

A plurality of propulsors in the form of propellers 46 is provided on each wing 44, which provide thrust to drive the aircraft forward. The plurality of propellers 46 on each wing together define a centre of thrust 70, i.e. a notional line extending rearwardly from the centre of the airflow provided by the propellers 46 on that wing 44. In the described embodiment, four propellers 46 are provided on each wing 44 giving a total of eight propellers 46, though more or fewer propellers may in some cases be provided. The relatively large number of propellers enables a relatively large propulsor disc area to be employed. Consequently, the propellers are highly efficient and relatively quiet, without requiring excessive ground clearance, which thereby reduces the length of the undercarriage.

Each wing further 44 comprises a generator arrangement comprising an internal combustion engine in the form of a gas turbine engine 54 and an electrical power generator (not shown). In the described embodiment, a single generator arrangement is provided on each wing 44, though further generator arrangements could be provided. The gas turbine engine 54 drives the electrical power generator to provide electrical power. An electrical energy storage device such as a capacitor, chemical battery or hydrogen fuel cell (not shown) might also be included, which could be charged by the gas turbine engine, and provide power to the propellers 46 for a short period on engine failure or to improve performance for short duration flight segments such as e.g. takeoff or climb.

FIG. 2 shows a cross sectional view along a span of the wing 44 of the aircraft 40 of FIG. 1, showing a propeller cyclic pitch arrangement 71 configured to cyclically alter the pitch of a respective propeller 46. A cyclic pitch arrangement 71 may be provided for one or more propellers 46, and in this embodiment is provided for each propeller 46. The propeller 46 comprises two propeller rotor blades 72, 74 which rotate about a propeller axis X, and are driven by a drive motor 48 via a hub 76. As can be seen from FIG. 2, the propeller axis X substantially intersects with a spanwise twisting axis of the wing, located at point T. In FIG. 2, blade 72 is shown in the lower position, and blade 74 is shown in the upper position. More or fewer blades could be provided as appropriate for different propeller torque or diameter requirements, as would be understood by the skilled person. The gyroscopic effect of the rotating mass of the rotor blades must also be accounted for—in general, lighter propeller discs are preferable, as this will decrease the gyroscopic effect.

The cyclic pitch arrangement 71 comprises a pair of blade pitch actuators in the form of electric motors in the form of stepper motors 78, which are configured to alter the pitch of a respective blade 72, 74 by pivoting the respective blade about their respective longitudinal axis. The blade pitch motors 78 are attached to the root of the blades 72, 74 such that they rotate with the blades 72, 74 in use. As shown in FIG. 2, the blade 74 in the upper position is rotated by the respective motor 78 to be in fine pitch (i.e. having a relatively small angle of attack relative to the relative airflow over the blade 74), while the blade 72 in the lower position is rotated by the respective motor 78 to be in course pitch (i.e. having a relatively large angle of attack relative to the relative airflow over the blade 74). Consequently, blade 72 will generate more thrust than blade 74.

The cyclic pitch arrangement 71 further includes a cyclic pitch controller 80 which is in signal communication with the blade pitch motors 78 to control the respective motors, and therefore the blade 72, 74 pitch in flight. The controller 80 is also in signal communication with a blade rotational position sensor, which could comprise the drive motor 48, to thereby sense the rotational position of the blades 72, 74 as they rotate in use. The cyclic pitch controller 80 is in turn in signal communication with a main flight controller such as a flight management system (FMS) 82 shown in FIG. 1.

In use, the FMS 82 sends signals to the or each controller 80 to cyclically control the blade pitch of the blades 72, 74 of the respective propellers 46. In the example shown in FIG. 2, the blades 72, 74 are controlled such that whichever blade is in the lower position is in course pitch, while whichever blade 72, 74 is in the upper position is in fine pitch. The pitch of the blades 72, 74 are continuously adjusted as the blades rotate, with the blade pitch transitioning to intermediate pitches in other positions, with the respective blades 72, 74 completing a cycle between fine and course pitch with each full revolution. Alternatively, the blades 72, 74 could be controlled such that the upper blade is in course pitch, and the lower blade is in fine pitch, again cycling from course to fine pitch and back again once per revolution.

As shown in FIG. 2, the force generated by the blades 72, 74 for given aircraft and atmospheric conditions (airspeed, propeller rotational speed etc) varies in accordance with blade pitch. As shown by arrows $A_1$ and $A_2$ (the length of the arrow representing the force generated), the lower blade 72 will produce more force (thrust) than the upper blade due to the courser pitch. The force produced by the blade 72, 74 generally increases linearly with blade angle up to the point at which the blade stalls. Since the force generated by the blades 72, 74 is generated radially outwardly from the rotational axis X, and since the blades 72, 74 are mechanically attached to the wing 44, a rotational torque T is transmitted to the wing 44 as a result of the cyclical pitching of the blades 72, 74. In FIG. 2, this torque is generated in a clockwise direction as viewed from the wing tip. As a result of this torque T, the wing 44 will be caused to locally deflect by pivoting movement in the form of twisting (i.e. warping) about a span of the wing relative to other parts of the aircraft 40 such as other parts of the wing 44 or the fuselage 42. This twisting effect has been found to be particularly pronounced in aircraft having a low torsional rigidity, such as aircraft having wings with large aspect ratios, and/or made from relatively flexible materials such as carbon fibre having a fibre direction extending generally along the span or the chord of the wing, such that the wing is stiff in desired directions, and flexible enough to allow twisting.

As a result of this local deflection, the angle of incidence of the wing will be increased, and so the angle attack α of the wing relative to the oncoming airflow will be caused to increase, thereby resulting in an increase in lift in that section of the wing. On the other hand, by operating the cyclic pitch in the opposite manner (with coarse pitch being provided for the upper blade, and fine pitch being provided for the lower blade), the wing 44 could be caused to deflect in the opposite direction, thereby reducing a of the region of the wing 44. This effect can be utilised in one or more of several different ways, as described below.

In a first method, the cyclic pitch arrangement 71 can be used to effect roll control. In this method, a signal commanding a roll input (such as a left hand roll in this example) is received from an aircraft flight control input such as a yoke controlled by the pilot or the autopilot, and sent to the FMS 82. The FMS 82 then provides a signal to the cyclic controllers 80 controlling some or all of the propellers 46 on the starboard wing to provide cyclic pitch of the blades 72, 74 such that the blade in the lower position is in coarse pitch, and the blade 72, 74 in the upper position is in fine pitch (i.e. the position shown in FIG. 2), such that the starboard wing 44 is twisted relative to the fuselage 42 such that the starboard wing obtains a higher a than the port wing, thereby causing an increase in lift on that wing. Meanwhile, the FMS 82 provides a signal to the cyclic controllers 80 controlling some or all of the propellers 46 on the port wing to provide cyclic pitch of the blades 72, 74 such that the blade in the lower position is in fine pitch, and the blade 72, 74 in the upper position is in coarse pitch, such that the port wing 44 is twisted relative to the fuselage 42 such that the port wing obtains a lower a than the port wing, thereby causing a reduction in lift on that wing. Consequently, the aircraft will be caused to roll to the left. Opposite cyclic control can be used to effect a right hand roll.

This method may be used in conjunction or replace movements of the ailerons. Advantageously, the ailerons could be supplemented by this method, which would provide a backup to the aileron flight surfaces, thereby increasing safety. Alternatively, the ailerons could be replaced, thereby reducing weight. This method of roll control is also thought to be more aerodynamically efficient, due to the reduction in air turbulence caused by this method. The control method is also usable up to any speed, without causing roll reversal. Consequently, the wing can be made less stiff (and lighter) still, since this does not need to be accounted for in the design. The lack of ailerons also reduces wing structure complexity, as cut-outs do not need to be provided.

In a second method, the cyclic pitch arrangement 71 can be used to effect increased lift in a manner similar to the use of flaps or slats by increasing the incidence of the wings 44 relative to the fuselage 42 in unison. In this method, a signal commanding a lift increase is received from an aircraft flight control input such as a flap setting/wing incidence selector controlled by the pilot or the autopilot, and sent to the FMS 82. The FMS 82 then provides a signal to the cyclic controllers 80 controlling some or all of the propellers 46 on both wings 44 to provide cyclic pitch of the blades 72, 74 such that the blade in the lower position is in coarse pitch, and the propeller in the upper position is in fine pitch (i.e. the position shown in FIG. 2), such that both wings 44 are twisted relative to the fuselage 42 such that the wings 44 obtain a higher a, thereby causing an increase in lift on the wings 44. Consequently, the wing incidence will be increased, and the aircraft will be caused to produce more lift, while the angle of the fuselage 42 relative to the ground remains unchanged. Consequently, the amount of lift produced can be adjusted without changing the angle of the fuselage 42 with respect to the ground. This can be particularly useful on landing and takeoff. Again, the method can be used in conjunction with other high lift devices such as flaps or slats, or could replace the flaps or slats, resulting in a weight saving. This is thought to be particularly advantageous on an aircraft having a large number of propulsors located ahead of a leading edge of the wing, since the angle of incidence of the propellers 46 will also be increased. Consequently, the increase in angle of attack α of the wing 44 will be less pronounced than the increased angle of incidence would suggest, as a result of the airflow from the propellers 46 over the wing 44. Again, this method of operation could be expected to result in aerodynamic and structural efficiency improvements, as outlined above in relation to ailerons. This method may be used in combination with flaps to provide further improved low speed lift performance. By increasing the angle of incidence of the wing relative to the fuselage, the deck angle (i.e. the angle of the cockpit relative to the ground) is maintained at a relatively low angle during takeoff and descent, thereby improving forward view and passenger comfort during takeoffs and landing.

In a third method, the cyclic pitch arrangement 71 can be used to effect vibration damping to prevent unwanted vibrations of the wing 44 such as flutter. One or more vibration sensors 84 could be provided, which are in signal communication with one or more cyclic controllers 80. The vibration sensors 84 could comprise strain gauges provided in the wing, which would provide electrical signals proportional to local wing twist to the cyclic controllers 80. These signals may be combined with accelerometer data to produce a picture of the velocity and acceleration of the structure local to each propeller. In combination, these data could provide the proportional and derivative elements of a PID (proportional-integral-derivative) control system, with the integral element being provided by integrated wing displacement. The cyclic controller 80 could therefore comprise a PID controller operating on these signals to control the propeller cyclic to minimise the vibrations. When operated to reduce flutter, signals indicating the direction and magnitude of vibrational movement of the wing 44 are provided by the vibration sensor 84 to the cyclic controller 80. The cyclic controller 80 provides a signal to the actuators 78 to control the propeller blade 72, 74 pitches to effect a torque on the wing as outlined above to counteract the vibrational movement. Consequently, the vibrational movement is damped, thereby reducing vibration of the wing. Consequently, the wing can be designed to have a lower torsional rigidity compared to other wing designs. This lower torsional rigidity could be achieved using a lower weight construction method, or by providing a higher aspect ratio wing, thereby resulting in weight and aerodynamic performance benefits.

In a fourth method, the cyclic pitch arrangement 71 can be used to reduce the effects of transient gusts on the aircraft 40. One or more gust sensors such as lidar (light detection and ranging) sensors 86 could be provided, which are configured to detect wind gusts ahead of the aircraft 40 (see FIG. 1). In one embodiment, a separate lidar sensor 86 is provided which detects gust conditions ahead of each propeller 46. The sensors 86 are in signal communication with one or more cyclic controllers 80. When operated to reduce the effects of transient gusts, signals indicating the timing, direction and magnitude of impending gusts are provided by the vibration sensor 84 to the cyclic controller 80. The cyclic controller 80 provides a signal to the actuators 78 to control the propeller blade 72, 74 pitches to effect a torque on the wing as outlined above to counteract the impending gust, by reducing or increasing the local a of the wing to reduce or increase the lift accordingly to cancel the increased or reduced lift that would otherwise be caused by the gust. Consequently, the effect of gusts is reduced, thereby providing improved comfort to the passengers, and reduced aircraft fatigue. Consequently, the wing can be designed to have a lower torsional rigidity compared to other wing designs. This lower torsional rigidity could be achieved using a lower weight construction method, or by providing a higher aspect ratio wing, thereby resulting in weight and aerodynamic performance benefits.

Figure 3:
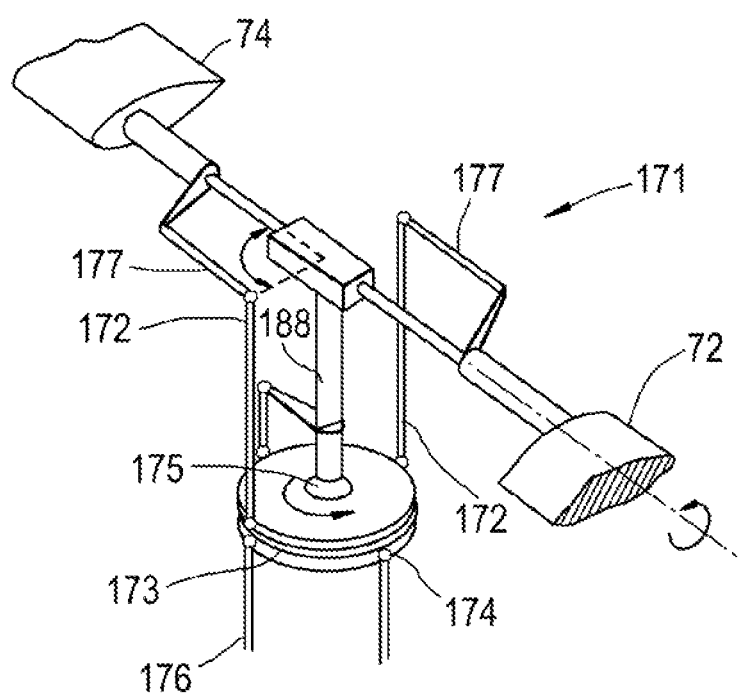
FIG. 3 shows a perspective side view of part of an alternative cyclic pitch change arrangement in accordance with the present disclosure.

FIG. 3 shows an alternative cyclic pitch arrangement 171 in accordance with the present disclosure in the form of a swashplate arrangement, which could be used on the aircraft 40 in place of the arrangement 71. The arrangement includes a drive axle 188, which is driven by the electric drive motor 48. The arrangement 171 further includes a push rod 172 for each blade 72, 74. Each push rod 172 is connected to a respective blade 72, 74 via a bell crank 177, which translates longitudinal movement of the push rod 172 to longitudinal pivoting of the respective blade 72, 74, and therefore adjusts the pitch of the respective blade 72, 74. The other end of each push rod 172 is connected to a swash plate 173 which is coupled to the drive axle 188 to rotate with the propeller blades 72, 74. The swash plate 173 is supported by a spherical bearing 175, such that it can pivot azimuthally as the swash plate 173 rotates. The swash plate 173 is also supported on roller bearings, which are in turn supported by a non-rotating cyclic pitch change actuator 174. The cyclic pitch change actuator 174 is supported by the spherical bearing 175, and azimuthally pivotable to a desired angle by push rods 176, which are in turn controlled by the cyclic pitch controller 80 via linear motors or similar actuators (not shown). Consequently, by pushing or pulling the push rods 176, cyclic pitch change can be effected in a similar manner to that of the arrangement 71. The arrangement 171 can be used in accordance with any of the described methods.

The following provides a specific example of the amount of angle of incidence deflection that must be provided by the system for a particular aircraft. Aircraft roll control is brought about by asymmetry of lift between the left and right sides of the aircraft. This force imbalance produces a couple about the centre of mass of the aircraft, which in turn generates a rotational acceleration. It follows that, for small control corrections, the required change in angle of attack may be thought of in terms of a rotational acceleration requirement imposed by pilot perception of handling qualities. It would be possible to examine the correlation between the angular acceleration rates achieved by various aircraft roll control systems and the handling qualities ratings given by test pilots.

Longer duration control inputs allow rotational velocity to increase. This changes the relative angle of attack between the left and right wings, tending to damp the acceleration. Eventually, a fixed roll rate is attained. Note that, for stiff structures, neglecting Mach number effects, and assuming irreversible powered controls, the roll rate is simply the product of the helix angle which the control deflection is capable of generating at the wing tip, and the True Air Speed (TAS) divided by the span.

In the case of wing warping, the helix angle is a dynamic pressure and moment weighted mean of the twist imposed by wing warping. It follows that, for a fixed roll rate requirement, the amount of twist which must be generated by the wing warping system varies inversely with TAS.

For example, consider an aircraft with a 50 m wingspan. The wing tips rotate through a circumference of $50\pi$ meters per rotation. If the roll rate required is e.g. 30°/s, it follows that the vertical component of tip speed is $50\pi/6$ m/s, which is about 26 m/s.

The helix angle at the wing tip is therefore $\tan(26/TAS)$.

FIG. 4 shows a second aircraft 140 in accordance with the present disclosure. The aircraft 140 is a VTOL (Vertical Takeoff and Landing) or STOVL (short takeoff, vertical landing) aircraft. The aircraft comprises a fuselage 142, a pair of wings 144 extending therefrom and an empennage comprising vertical and horizontal control surfaces 160, 166 located at an aft end of the fuselage 142. The aircraft 140 differs from the aircraft 40 in many respects, but utilises similar control methods. Propulsors in the form of propellers 146 are provided on each wing 144. Again, the propellers 146 are driven by electrical motors (not shown) which are provided with power from gas turbine engines 154. The propellers 146 are located ahead of a leading edge 145 of the wing 144 and comprise a plurality of blades, whose pitch is controlled cyclically by a cyclical pitch changing mechanism, such as that shown in either of FIG. 2 or 3.

The wings 144 have a significantly lower aspect ratio compared to that of aircraft 40, being approximately 10 or perhaps less. Consequently, the wings 144 are considerably stiffer than that of aircraft 40. The wings 144 are attached to the fuselage 142 by freely pivoting bearings 190, which allow the wings 144 to pivot about an axis extending generally horizontally, normally to the fuselage longitudinal axis, i.e. in a spanwise direction. Optionally, an actuable braking mechanism 192 may be provided to lock the wings 144 in position. A shaft 194 may link the bearings 192 of the port and starboard wings together, such that the wings move between first and second configurations in tandem. FIGS. 4_a_ and 5_a_ show the aircraft 140 in a first configuration with the wings 44 pivoted to a forward position, in which the leading edge 145 of the wing 144 extends horizontally, toward the nose of the aircraft 140. In this position, the aircraft 140 is configured for normal level flight. As shown in FIGS. 4_b_ and 5_b_, the aircraft 140 is in a second configuration, with the wings 44 pivoted to an upward position, in which the leading edge 145 of the wing 144 extends upwardly. In this position, the aircraft 140 is configured for vertical takeoff and landing.

Such an arrangement in which the whole wing (including wing mounted propulsors) is pivoted between horizontal and vertical positions for vertical takeoff and horizontal flight respectively is known in the art as a "tiltwing" configuration. Traditional tiltwing configurations have high efficiency in both vertical takeoff/landing and horizontal flight modes compared to "tiltrotor" resigns, in which only the propellers are tilted between vertical and horizontal positions. However, previous tiltwing designs have generally been unsuccessful, in part due to the complexity of the mechanisms for tilting the wing, as well as the complexity of mechanisms for ensuring safe flight subsequent to the failure of one engine.

In accordance with the present disclosure, the aircraft 140 is transitioned between the first and second configurations by use of cyclic pitch of the blades of the propellers 146. As previously described in relation to aircraft 40, cyclic pitch control produces a torque on the wing 144. Due to the high stiffness of the wing 144 and the freely rotating bearing 190 attaching the wings 144 to the fuselage 142, cyclic pitching of the propellers 146 can be utilised to cause the wing 144 to pivot between the first and second configurations.

Figure 5A:
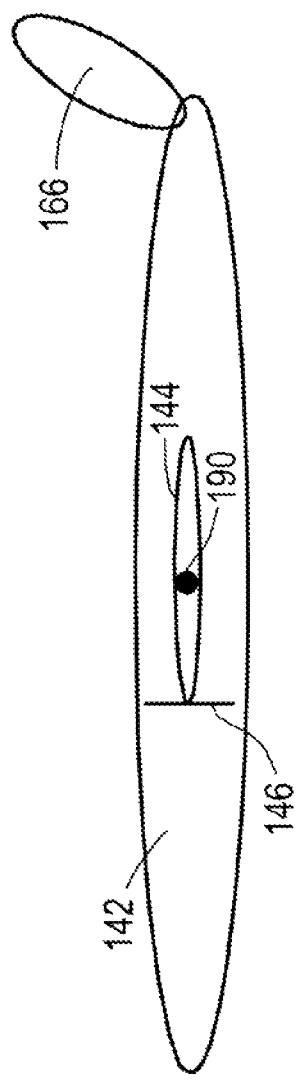
FIGS. 5a and 5b are side views of the aircraft of FIGS. 4a and 4b in the first and second configurations respectively.

For example, referring to FIG. 2, with the wing in the first configuration as shown in FIGS. 4*a* and 5*a*, and the locking mechanism 192 disengaged, the cyclic pitch mechanism is used to place the pitch of the lower blade 72 in coarse pitch (and so produce a large amount of thrust below the wing 144), and place the pitch of the upper blade 74 in fine pitch (and so produce a relatively small amount of thrust above the wing). Consequently, a torque is generated on the wing 144. This causes the wing 144 to pivot clockwise as shown in FIG. 2, thereby tilting the wing 144 and propeller 146 to the vertical position, thereby permitting vertical takeoff and landing. When in the second configuration, the propeller cyclic pitch control can also be utilised to provide control of the aircraft 140 in hover, similar to that provided in a helicopter, as would be understood by the skilled person. Once in the second configuration, the braking mechanism 192 may be used to lock the wing 144 in position to prevent pivoting of the wing 144 in response to propeller cyclic pitch variation. Similarly, the aircraft 140 can be returned to the first configuration by unlocking the braking mechanism 192, and applying cyclic pitch in the opposite direction to move the wings 144 back to the first configuration.

Advantageously, this arrangement provides relatively lightweight, reliable movement of the wings 144 between the first and second configurations. Since two propellers 146 are provided, redundancy is automatically provided in the aircraft 144, provided the wings 144 are mechanically linked. Alternatively, the wings 144 could be independently pivotable by connection to the fuselage 142 via independent bearings 190, thereby permitting roll control in a similar manner to that described in relation to aircraft 40. Since the propellers 146 are electrically powered, provision can be made for cross linking the propellers 146 using flexible electrical connections, which allows the propellers to be powered even on failure of a gas turbine generator, without the requirement for complex and heavy cross shafts.

Figure 5B:
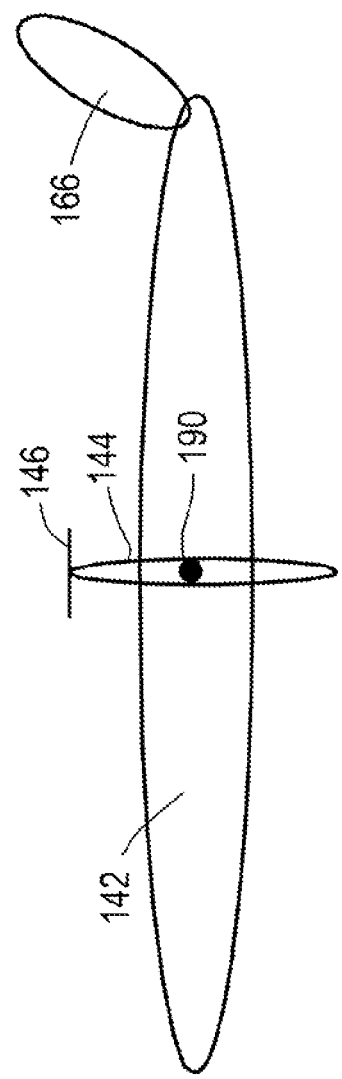

The wing 144 may further comprise flaps 152, as shown in FIGS. 4 and 5. The flaps are shown in a deployed position in FIG. 4*a*. As would be understood by the skilled person, deployment of the flaps will create additional lift at a given angle of incidence, but will also move the centre of lift rearwardly on the wing, thereby creating a torque in an anti-clockwise direction as shown in FIG. 2. This will normally have the result of twisting or pivoting the wing downwardly (in a flexible wing or pivotable), thereby decreasing the angle of incidence and therefore decreasing lift somewhat, or causing the nose to point downwardly. However, in the present disclosure, propeller cyclic pitch can be utilised to counteract this torque, by placing the lower blade in coarse pitch, and the upper blade in fine pitch to create a clock-wise torque to counteract the torque created by the flaps 152 when deployed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, while the propellers are described in the specific embodiment as being electrically driven, with power supplied from gas turbine engines, the propellers could instead be provided with power from a different power source, such as a piston engine, batteries, or a fuel cell. Alternatively, the propellers could be directly driven by piston engines or gas turbine engines. The blade pitch actuators could be driven pneumatically or hydraulically, rather than by an electrical motor.

The brake could also be used to achieve roll/yaw/pitch control. By braking the movement both wings together, the inertia in the wing could provide pitching movement. Similarly, by braking each wing differentially, yaw/roll control could be provided.

In some cases, only parts or sections of the aerofoil may be pivotable using propeller cyclic control. For example, an outer section of the wing could have a lower stiffness, such that roll control can be achieved more effectively. Alternatively or in addition, where the cyclic pitch control actuable portion of the wing is pivotable about a bearing, a plurality of bearings could be provided, or the bearing could be provided part way along the wing, with the propeller located outboard of the bearing, again so that effective roll control can be achieved.

Cyclic pitch controllable propellers could additionally or alternatively be provided on other aerofoils of the aircraft, such as the vertical tail surface 60 (i.e. rudder) or horizontal tail surface 66. In such cases, twisting of the respective aerofoils to which the cyclically controlled propellers are mounted would caw yaw and pitching movements respectively. Similarly, cyclic pitch propellers could be mounted to a forward canard in a canard configuration aircraft, in which, again, twisting of the canards would cause pitching moments to the aircraft.

In order to provide redundancy, it may be necessary to show that, on failure of the propeller cyclic controlled flutter alleviation system, the aircraft will not experience flutter for extended periods of time. Consequently therefore, the aircraft may comprise an optional health monitoring system to determine whether one or more cyclic actuators is operable. An aircraft control system (such as the FMS) may be provided, which is configured to decelerate the aircraft to a speed below a critical flutter speed (i.e. a speed above which unacceptable levels of flutter are experienced) where one or more cyclic actuators is found to be inoperable.

Additionally, the aircraft control system may, upon detecting failure of an actuator, determine that a change in the control strategy applied to the other actuators (such as, for example, an increase in gain) may permit the flight to safely continue at the normal cruising speed.

The aircraft configuration could be different to that shown, comprising for instance a blended wing body aircraft, in which the wing and fuselage are blended into one another rather than being distinct, or a flying wing aircraft, in which the fuselage is entirely omitted.

Aspects of any of the embodiments of the invention could be combined with aspects of other embodiments, where appropriate.

The invention claimed is:

1. An aircraft comprising:
   an aerofoil rigidly mounted to the aircraft;
   a propeller mounted to the aerofoil and coupled to a propeller cyclic actuator configured to cyclically alter the pitch of the propeller as the propeller rotates; wherein
   the aircraft is configured such that provision of cyclic pitch to the propeller pivots and twists at least a portion of the aerofoil about a span of the aerofoil relative to the remainder of the aircraft and an aircraft flight path vector, to thereby adjust the local angle of incidence of at least part of the aerofoil to effect roll control of the aircraft.

2. The aircraft according to claim 1, wherein the aerofoil is mounted to the aircraft by a bearing arrangement, and the aircraft is configured such that provision of cyclic pitch pivots the aerofoil about the bearing between a first position in which a leading edge of the aerofoil faces generally forwardly, and a second position in which the leading edge of the aerofoil faces generally upwardly.

3. The aircraft according to claim 1, wherein the aerofoil comprises one or more of a wing, a vertical tail surface and a horizontal tail surface.

4. The aircraft according to claim 3, wherein the aircraft comprises a propeller mounted to a port wing, and a further propeller mounted to a starboard wing.

5. The aircraft according to claim 4, wherein the aircraft comprises a plurality of propellers mounted to each wing.

6. The aircraft according to claim 1, wherein the respective propeller cyclic actuator comprised a motor configured to pivot a respective propeller blade about a longitudinal axis of the respective blade.

7. The aircraft according to claim 1, wherein each propeller cyclic actuator comprises a swash plate arrangement.

8. The aircraft according to claim 3, wherein the wing comprises an aspect ratio greater than 10.

9. The aircraft according to claim 3, wherein each propeller is electrically driven, and each propeller is located upstream of the respective wing leading edge.

10. The aircraft according to claim 1, wherein the aircraft comprises one or more generator arrangements configured to provide electrical power to one or more propellers, and wherein the generator arrangement comprises one or more internal combustion engine located outboard of the centre of thrust of the propellers on the respective wing.

11. The aircraft according to claim 1, wherein the aircraft comprises a health monitoring system to determine whether one or more cyclic actuators is operable, and an aircraft control system configured to decelerate the aircraft to a speed below a critical flutter speed where one or more cyclic actuators is found to be inoperable.

12. The aircraft according to claim 1, further comprising a controller that effects the roll control by altering the pitch of the propeller, via the propeller cyclic actuator, as the propeller rotates to twist at least the portion of the aerofoil about the span of the aerofoil and adjust the local angle of incidence of at least the part of the aerofoil.

13. The aircraft according to claim 1, wherein the controller alters the pitch of the propeller to a different extent to that of another propeller of the aircraft to twist at least the portion of the aerofoil about the span of the aerofoil and adjust the local angle of incidence of at least the part of the aerofoil effect a roll moment of the aircraft.

14. The aircraft according to claim 1, wherein the local angle of incidence of at least part of the aerofoil to effect roll control of the aircraft is adjusted by deformation of the aerofoil.

15. A method of controlling an aircraft, the aircraft comprising a starboard wing and a port wing each rigidly mounted to the aircraft, at least one propeller mounted to the port wing and at least one propeller mounted to the starboard wing, each propeller being coupled to a propeller cyclic actuator configured to cyclically alter a pitch of the propeller as the propeller rotates, the aircraft being configured such that provision of the cyclic pitch to the propeller pivots at least a portion of the respective wing about a span of the wing relative to the remainder of the aircraft and an aircraft flight path vector, to thereby adjust the local angle of incidence of at least part of the wing, the method comprising:
altering the propeller cyclic on the propeller to one of the port and starboard wing to a different extent to that of the propeller mounted to the other of the port and starboard wing to twist at least a portion of the respective wing to thereby adjust the angle of incidence of the respective wing to effect a roll moment of the aircraft.

16. The method according to claim 15, wherein each wing of the port and starboard wings comprises a plurality of propellers, and the method comprises providing propeller cyclic pitch on at least one of the propellers mounted to the wing to a different extent to that of one of the other propellers mounted to the wing to thereby effect a local twisting of a portion of the wing to effect a local reduction or increase of angle of attack of that wing to effect roll control.

17. The method according to claim 15, wherein the aircraft comprises at least one propeller on each wing of the port and starboard wings, and the method comprises providing cyclic pitch of all of the propellers in unison to twist the port and starboard wings relative to the flight path vector to effect an increase in angle of incidence of both wings.

18. The method according to claim 15, wherein the method comprises detecting or predicting a vibration of the wing, and using cyclic propeller pitch to effect local twisting of a portion of the wing to dampen the detected vibration.

19. The method according to claim 15, wherein the method comprises detecting or predicting a gust, and using cyclic propeller pitch to effect twisting of at least a portion of the wing to reduce or increase or reduce the angle of incidence of the respective portion of the wing to accommodate the change in lift produced by the gust.

20. The method according to claim 15, wherein the local angle of incidence of at least part of the wing to effect roll control of the aircraft is adjusted by deformation of the wing.

21. An aircraft comprising:
a propeller mounted to an aerofoil and coupled to a propeller cyclic actuator configured to cyclically alter the pitch of the propeller as the propeller rotates; wherein
the aircraft is configured such that provision of cyclic pitch to the propeller pivots at least a portion of the aerofoil about a span of the aerofoil relative to the remainder of the aircraft and an aircraft flight path vector, to thereby adjust the local angle of incidence of at least part of the aerofoil, and
the aircraft comprises a health monitoring system to determine whether one or more cyclic actuators is operable, and an aircraft control system configured to decelerate the aircraft to a speed below a critical flutter speed where one or more cyclic actuators is found to be inoperable.

* * * * *